United States Patent [19]

Moriguchi et al.

[11] 4,390,666
[45] Jun. 28, 1983

[54] POLYETHYLENE BLEND COMPOSITION

[75] Inventors: Kisoo Moriguchi; Naoji Yoshii, both of Kurashiki, Japan

[73] Assignee: Asahi Kasei Kogyo Kabushiki Kaisha, Osaka, Japan

[21] Appl. No.: 403,683

[22] Filed: Jul. 30, 1982

[30] Foreign Application Priority Data

Aug. 14, 1981 [JP] Japan ................. 56-126587

[51] Int. Cl.$^3$ ................. C08L 23/06; C08L 23/26
[52] U.S. Cl. ................. 525/194; 525/240
[58] Field of Search ................. 525/240, 194

[56] References Cited

U.S. PATENT DOCUMENTS 3,806,558 4/1974 Fischer ................. 525/240
3,988,395 10/1976 Myerholtz ................. 525/240

FOREIGN PATENT DOCUMENTS 2019412 10/1979 United Kingdom ................. 525/240

Primary Examiner—Carman J. Seccuro
Attorney, Agent, or Firm—Sprung, Horn, Kramer & Woods

[57] ABSTRACT

A crosslinked polyethylene composition having excellent physical properties (e.g., a high stiffness, a high ESCR, and a high impact strength) and improved molding properties (e.g., an improved melt tension and an improved dye swell) is disclosed. This composition is obtained by lightly crosslinking and intimately melt blending a composition comprising high- and medium-density polyethylene (A) having a high molecular weight and high- and medium-density polyethylene B having a low molecular weight, wherein (i) the viscosity-average molecular weight of polyethylene (A) is 100,000 through 1,000,000, the viscosity-average molecular weight of polyethylene B is 1,000 through 100,000, and the ratio of the molecular weight of polyethylene (A) to that of polyethylene (B) is 2 through 100, (ii) the blending ratio of polyethylene (A) to polyethylene (B) is 5:95 through 80:20, and (iii) $(MI)_1$ is 0.01 through 3.5, the ratio of the expansion factor $\alpha_2$ to $\alpha_1$ ($\alpha_2/\alpha_1$) is 1.1 through 10, and the ratio of $(MI)_2$ to $(MI)_1$ [$(MI)_2/(MI)_1$] is 0.03 through 0.9, wherein $(MI)_1$ and $(MI)_2$ are melt indexes of the polyethylene compositions before and after crosslinking, respectively, and $\alpha_1$ and $\alpha_2$ are expansion factors of the polyethylene compositions before and after crosslinking, respectively.

7 Claims, No Drawings

POLYETHYLENE BLEND COMPOSITION

The present invention relates to a cross-linked polyethylene composition having excellent physical properties and molding properties.

Polyethylene is processed by injection molding, blow molding, film molding, extrusion molding, rotary molding, or other various molding methods to form various molded articles. The characteristics of the polymers are designed so as to be satisfactory for the intended use of the polymers and for the molding method since the required properties or characteristics of the polymers are different depending upon the molding methods and the intended use of the molded articles. For instance, a polymer having a relatively low molecular weight and a relatively narrow molecular weight distribution is suitable for use in injection molding. On the other hand, a polymer having a relatively high molecular weight and a relatively wide molecular weight distribution is suitable for use in extrusion molding, blow molding, or inflation film molding.

Japanese Patent Publication (Kokoku) Nos. 45-3215/70 and 45-22007/70 propose a method for melt blending a polyethylene having a high molecular weight and a polyethylene having a low molecular weight, which are previously and separately polymerized as a method for producing polyethylene having a wide molecular weight distribution and being suitable for use in extrusion molding. The polymer composition thus produced exhibits a sufficient stiffness and chemical resistance even at a thin section thickness since there is an excellent balance between the stiffness and the environmental stress cracking resistance (ESCR) of the polymer composition as compared with that of polymers produced by conventional methods. Accordingly, pipes, bottles, and other molded articles obtained by molding the polymer composition are comparable, at a light weight, to conventional molded articles in regard to the required physical properties and, therefore, the proposed method is industrially valuable from the viewpoint of conserving raw material and energy. Furthermore, a high stiffness and good ESCR enable the polymer composition to be used under extremely severe conditions. Thus, molded articles having a high functionality can be obtained from the proposed polymer composition as compared with conventional polyethylene.

It should be, however, noted that although polymer compositions produced by melt blending high molecular weight polyethylene and low molecular weight polyethylene have the above-mentioned excellent properties, they have the following disadvantages:

(1) The impact strength is low as compared with conventional polyethylene and, therefore, the high ESCR cannot be practically and effectively utilized.

(2) The melt tension is low and, therefore, so-called "draw down" is likely to occur during molding. As a result, in the molding of bottles, cans, and other molded articles, so-called gauge variation occurs or an increase in the molding speed is difficult due to the unstable molding operation.

(3) The die swell is low and, therefore, molded articles having a constant or uniform quality are difficult to obtain because the section thickness becomes thin when a die conventionally used for ordinary polyethylene is used in the case of blow molding for bottles or in the case of extrusion molding for sheets or pipes. The section thickness can be adjusted by changing the die. However, changing the die is industrially disadvantageous because the productivity decreases and different dies are required.

Accordingly, an object of the present invention is to eliminate the above-mentioned disadvantages in the prior arts and to provide an improved polyethylene composition having practically good physical properties and molding properties.

Other objects and advantages of the present invention will be apparent from the description set forth hereinbelow.

In accordance with the present invention, there is provided a crosslinked polyethylene composition obtained by lightly crosslinking and intimately melt blending a composition comprising high- and medium-density polyethylene (A) having a high molecular weight and high- and medium-density polyethylene (B) having a low molecular weight, wherein (i) the viscosity-average molecular weight of polyethylene A is 100,000 through 1,000,000, the viscosity-average molecular weight of polyethylene B is 1,000 through 100,000, and the ratio of the molecular weight of polyethylene A to that of polyethylene B is 2 through 100, (ii) the blending ratio of polyethylene A to polyethylene B is 5:95 through 80:20, and (iii) melt index $(MI)_1$ is 0.01 through 3.5, the ratio of expansion factor $\alpha_2$ to expansion factor $\alpha_1$ ($\alpha_2/\alpha_1$) is 1.1 through 10, and the ratio of $(MI)_2$ to $(MI)_1$ $(MI)_2/(MI)_1$ is 0.03 through 0.9, wherein $(MI)_1$ and $(MI)_2$ are melt indexes of the polyethylene compositions before and after crosslinking, respectively, and $\alpha_1$ and $\alpha_2$ are expansion factors of the polyethylene compositions before and after crosslinking, respectively.

According to the present invention, a polyethylene composition having extremely excellent physical properties (i.e., a high stiffness, a high ESCR, and a high impact strength) and improved molding properties (i.e., an improved melt tension and an improved die swell) can be obtained. This polyethylene composition is suitable for use in extrusion molding, blow molding, and film molding, these methods being widely used as industrial molding methods.

As is known in the art, when polyethylene is crosslinked, the viscoelastic behavior, the mechanical properties, and the thermal properties are modified. As a result, crosslinked polyethylene is utilized in the fields of wire coating, foamed articles, and various other molded articles. The crosslinking of polyethylene is a long-established technique. For instance, U.S. Pat. No. 3,079,379 and British Pat. No. 1,001,343 disclose methods for chemically crosslinking polyethylene. Furthermore, Japanese Patent Publication (Kokoku) Nos. 39-18546/64 and 49-18101/74 and British Pat. Nos. 1,286,460 and 1,294,154 disclose various improvements in methods for chemically crosslinking polyethylene.

However, these publications neither disclose nor teach the above-mentioned crosslinked polyethylene composition of the present invention. According to the conventional crosslinking methods, polyethylene is highly crosslinked so as to swell in a solvent such as xylene (i.e., gelling occurs). Furthermore, the known publications do not disclose a specified polyethylene to be crosslinked.

Contrary to the above, according to the present invention, the specified composition of high molecular weight polyethylene A and low molecular weight polyethylene B is crosslinked, and crosslinking is lightly carried out so that the polyethylene does not swell in a solvent such as xylene (i.e., gelling does not occur).

Furthermore, Japanese Patent Publication (Kokoku) No. 50-14672/75 proposes a method for obtaining polyethylene having a high die swell by treating a specified polyethylene together with a radical forming agent at a temperature of not less than the melting temperature of the polyethylene in an extruder. However, this publication does not teach the use of a composition of high molecular weight polyethylene and low molecular weight polyethylene as polyethylene to be crosslinked. That is to say, this publication proposes a polyethylene composition in which the flow rate ratio of an apparent shearing stress of $10^6$ dyne/cm$^2$ to an apparent shearing stress of $10^5$ dyne/cm$^2$ is 18 to 28. On the other hand, said flow rate ratio of the present polyethylene composition comprising high molecular weight component A and low molecular weight component B is 30 to 500. Furthermore, the above-mentioned publication is completely silent concerning a method for obtaining the present crosslinked polyethylene composition having the above-mentioned excellent extensive characteristics. This publication only teaches a method for improving the die swell and the flow rate ratio.

As mentioned hereinabove, the essence of the present invention resides in the fact that a composition comprising high- and medium-density polyethylene A having a high molecular weight and high- and medium-density polyethylene B having a low molecular weight is lightly crosslinked. This light crosslinking results in not only improvements in practical characteristics such as impact strength, ESCR, and die swell but also in improvements in basic characteristics such as the MI and intrinsic viscosity, as compared with conventional crosslinking of polyethylene, as shown in the Examples hereinbelow. This suggests that there is a big difference in the formation of a branched structure due to crosslinking bonds between polymer molecules and in the manner of modification of the polymer molecule structures in the case of crosslinking the polyethylene alone and the polyethylene composition.

The present invention will further be explained in detail. High- and medium-density polyethylene components (A) and (B) usable in the present invention include ethylene homopolymers, copolymers of ethylene and other olefins and/or dienes, and mixtures thereof, all having a density of 0.93 through 0.98. The olefins and dienes usable for copolymerization with ethylene include, for example, α-olefins such as propylene, butene, pentene, 4-methylpentene-1, hexene, octene, and decene, diolefins such as butadiene and isoprene, and cycloolefins such as cyclopentene, cyclohexene, cyclopentadiene, and norbornene.

The viscosity-average molecular weight of high molecular weight component A should be 100,000 through 1,000,000, desirably 120,000 through 800,000. The viscosity-average molecular weight of low molecular weight component B should be 1,000 through 100,000, desirably 5,000 through 80,000. The ratio of the molecular weight of polyethylene A to that of polyethylene B should be 2 through 100, desirably 3 through 50. A molecular weight ratio of less than 2 results in a decrease in the flow rate ratio or the MIR and provides conventional properties similar to those of known crosslinked polyethylene. Thus, the desired excellent physical properties and molding properties cannot be obtained. Contrary to this, a molecular weight ratio of more than 100 is not, merit orious since it does not improve the physical properties and molding properties and since it is disadvantage in respect to production.

The blending ratio of component A to component B should be 5:95 through 80:20, desirably 20:80 through 70:30. More than 95% by weight of component B based on the weight of the composition or less than 20% by weight of component B based on the weight of the composition does not result in a crosslinked polyethylene composition having both the desired excellent physical properties and the desired excellent molding properties. Thus, only a cross-linked polyethylene having known and conventional properties can be obtained.

High- and medium-density polyethylene components A and B may be prepared by conventional suspension polymerization, vapor phase polymerization, or solution polymerization. Any known polymerization catalysts may be used so long as above-mentioned polyethylene components A and B can be prepared. However, in order to obtain crosslinked polyethylene suitable for use in film molding, blow molding, and extrusion molding, the number of double bonds contained in polyethylene components A and B is desirably not more than 0.15 per 1,000 carbon atoms. A crosslinked polyethylene composition having too large a number of double bonds results in a decrease in the practical properties of the composition. For instance, the MI is changed during the molding operation, a so-called fish eye is formed in the molded article, and the recycling properties are poor.

In order to effectively prepare this type of polyethylene industrially, highly active catalysts are desirably used so that a catalyst removal process is not required. Such catalysts and polymerization methods in which they are disclosed in, for example, Japanese Patent Publication (Kokoku) Nos. 52-36788/77, 52-36790/77, 52-36796/77 and 52-36917/77, British Patent Nos. 1,503,779 and 1,498,852, Japanese Patent Application Laid-open (Kokai) No. 52-127490/77 and U.S. Pat. No. 4,159,965. These catalysts and polymerization methods generally produce polyethylene in which the number of double bonds is 0.05 to 0.15 per 1,000 carbon atoms.

The polyethylene composition comprising above-mentioned polyethylene components (A) and (B) can be prepared by blending or kneading components (A) and (B), which have been separately prepared, or by continuously polymerizing polyethylene components A and B in a multi-stage (i.e., two or more stages) polymerization manner. Especially, from the viewpoint of improving all of the physical properties, a composition is desirably prepared by blending or mixing above-mentioned polyethylene components (A) and (B), which have been separately prepared.

The above-mentioned polyethylene composition comprising polyethylene components (A) and (B) may be crosslinked by any known crosslinking methods, for example, chemical crosslinking using chemical crosslinking agents and radiation crosslinking using radiation irradiation. Of these known crosslinking methods, chemical crosslinking is desirably used in the production of the present invention from the viewpoints of the production operation and the physical properties of the crosslinked composition.

The crosslinking agents usable in chemical crosslinking include, for example, organic peroxides such as benzoylperoxide, di-t-butylperoxide, di-cumylperoxide, 2,5-dimethyl-2,5-di(t-butylperoxy)hexane, 2,5-dimethyl-2,5-di(t-butylperoxy)hexyne, 1,3-bis(t-butylperoxyisopropyl)benzene, 1-butyl-hydroperoxide, cumene hydroperoxide, lauroyl peroxide, di-t-butyl-diperoxyphthalate, t-butylperoxy maleic acid, and isopropylpercarbonate, azo compounds such as azobisisobutyronitrile, and inorganic peroxy compounds such as ammonium persulfate. These compounds may be used alone or in any mixture thereof. Of these crosslinking agents, especially preferred are those having a decomposition temperature of 170° C. to 200° C. at a half-life of 1 minute such as di-t-butylperoxide, di-cumylperoxide, 2,5-dimethyl-2,5-di(t-butylperoxy)hexane, 2,5-dimethyl-2,5-di(t-butylperoxy)hexyne, and 1,3-bis(t-butylperoxyisopropyl)benzene.

In addition to the above-mentioned crosslinking agents, crosslinking auxiliaries may be used together if desired. The crosslinking auxiliaries usable in the present invention include, for example, p-quinon dioxime, laurylmethacrylate, ethyleneglycol acrylate, diallylfumarate, triallylcyanurate, maleimide, and low molecular weight 1,2-polybutadiene. These compounds may be used alone or in any mixture thereof.

Chemical crosslinking may be carried out by, for example, adding the crosslinking agent and, if necessary, the crosslinking auxiliary to the composition containing polyethylene components (A) and (B) in a predetermined amount and then thoroughly blending or mixing the composition in a mixing apparatus such as a ribbon blender, a Henschel mixer, or other similar mixers. The resultant mixture is then intimately melt blended or kneaded in, for example, a conventional extruder or kneader, thereby effecting the desired crosslinking.

It should be noted that the especially important point of the present invention is to effect the crosslinking reaction after polyethylene components (A) and (B) are uniformly dispersed or while polyethylene components (A) and (B) are being uniformly blended and dispersed. That is, as mentioned above, crosslinking is desirably carried out by blending or kneading the polyethylene composition containing the crosslinking agent in an extruder or kneader.

Alternatively, the desired crosslinking may be carried out by first crosslinking either polyethylene component (A) or polyethylene component (B) to some extent and then adding the other component while the crosslinking agent is still present in the system. Furthermore, the desired chemical crosslinking may be carried out by first crosslinking either polyethylene component (A) or polyethylene component (B) and then adding the other component together with the additional crosslinking agent.

Extruders or kneaders usable in the present invention may be single-screw type or double-screw type ones. Double-screw type extruders or kneaders are desirably used in the practice of the present invention. For instance, a CIM kneader (manufactured by Japan Steel Works, Ltd.), FCM and DSM kneaders (manufactured by Farrel Corporation, U.S.A.), and conventional Banbury mixers are desirably used as a double-screw type kneader.

In the practice of the present invention, control or adjustment of the degree of crosslinking is important. As is known in the art, the crosslinking of polyethylene results in a change in the melt index (which is referred to as "M.I." herein) and the expansion factor (which is referred to as "$\alpha$" herein). That is, the MI is decreased and expansion factor $\alpha$ is increased. Expansion factor $\alpha$ is defined as follows.

$$\alpha = [\eta]\,DCL/[\eta]\,DOA$$

wherein:

$[\eta]$ DCL is an intrinsic viscosity in decalin at 135° C.; and $[\eta]$ DOA is an intrinsic viscosity in dioctyladipate at 145° C.

When the expansion factor $\alpha$ and the MI of the polyethylene composition containing polyethylene components (A) and (B) before crosslinking are referred to as $\alpha_1$ and $(MI)_1$, respectively, and when the expansion factor $\alpha$ and the MI of the crosslinked polyethylene composition are referred to as $\alpha_2$ and $(MI)_2$, respectively, crosslinking should be controlled to such as extent that $(MI)_1$ is 0.01 through 3.5, the ratio $\alpha_2/\alpha_1$ is 1.1 through 10, and the ratio $(MI)_2/(MI)_1$ is 0.03 through 0.9. An $\alpha_2/\alpha_1$ ratio of less than 1.1 or a $(MI)_2/(MI)_1$ ratio of more than 0.9 does not result in the desired improvement in the practical properties. Contrary to this, an $\alpha_2/\alpha_1$ ratio of more than 10 or a $(MI)_2/(MI)_1$ ratio of less than 0.03 results in undesirably high crosslinking so that the resultant polyethylene composition is contaminated with gel polymers and the polymer structure becomes nonuniform. Furthermore, a $(MI)_1$ of more than 3.5 does not result in a satisfactory ESCR due to crosslinking so that the desired composition having good total physical properties suitable for extrusion molding and blow molding cannot be obtained. A $(MI)_1$ of less than 0.1 does not result in the desired composition having a good moldability suitable for extrusion molding, blow molding, and film molding.

Especially desirable polyethylene compositions suitable for extrusion molding (e.g., pipe extrusion) and blow molding (e.g., large-sized molded articles such as a drum) have a $(MI)_1$ of 3 or less, an $\alpha_2/\alpha_1$ ratio of 1.5 through 5.0, and a $(MI)_2/(MI)_1$ ratio of 0.05 through 0.7.

The degree of crosslinking can be controlled by suitably selecting the kinds and concentrations of the above-mentioned crosslinking agents and the methods and conditions, taking into account the characteristics of the polyethylene composition before crosslinking. Generally speaking, crosslinking is carried out in a crosslinking agent concentration of not less than about 0.001% by weight but less than 0.1% by weight, desirably 0.003% through 0.02% by weight, based on the total weight of the composition including the crosslinking agent, at a crosslinking temperature of 150° C. to 290° C., desirably 170° C. to 250° C., for about 1 to 5 minutes. Crosslinking at a temperature at which the polyethylene composition does not melt well (e.g., less than about 150° C.) or at a temperature at which the polyethylene starts to decompose (e.g., more than about 300° C.) is not desirable because the crosslinking reaction does not uniformly occur and decomposition occurs, respectively. Heat kneading or blending is desirably carried out in an atmosphere in which the oxygen content is low, for example, under a nitrogen seal, so that a uniform polymer structure is obtained and undesirable side reactions, such as an oxidation reaction, do not occur.

The crosslinked polyethylene composition of the present invention can contain or be blended with various conventional additives such as stabilizers, anti-oxidants, ultraviolet absorbing agents, antistatic agents, pigments, inorganic or organic fillers, and a small amount of rubber and other polymers in a conventional manner. However, it should be noted that the additives (e.g., conventional stabilizers and ultraviolet absorbing agents) which may be directly reacted with the crosslinking agents are desirably added to the composition after the completion of the crosslinking reaction. The additives (e.g., conventional pigments, inorganic or organic fillers) which are not directly reacted with the crosslinking agent can be added to the composition either before or after the crosslinking reaction. Examples of such additives are Irganox 1010 (i.e., tetrakis-[methylene(3,5-di-tert-butyl-4-hydroxyhydrocinnamate)]methane), Irganox 1076 (i.e., octadecyl 3-(3′,5′-di-tert-butyl-4′-hydroxyphenyl)propionate) (manufactured by Chiba Geigy Co.), BHT (2,6-di-tert-butyl-p-cresol, DLTDP dilauryl thiodipropionate), calcium stearate, zinc stearate, titanium white, calcium carbonate, talc, styrene-butadiene rubber, and ethylene-vinyl acetate copolymer.

The present invention will now be specifically illustrated by, but is by no means limited to, the Examples set forth below.

The physical properties used in the following Examples were determined as follows:

(i) MI: Determined at a temperature of 190° C. under a load of 2.16 kg according to an ASTM D-1238 method.

(ii) MIR: A melt flow value determined under the same conditions as used in the determination of MI except that the load was changed to 21.6 kg was divided by MI.

(iii) Density: Determined according to an ASTM D-1505 method.

(iv) Molecular weight ($M_w$): Determined from the following equation described in Journal of Polymer Science 36, 91 (1957)

$$[\eta] = 6.8 \times 10^{-4} M_w^{0.67}$$

wherein a intrinsic viscosity $[\eta]$ was determined at 135° C. by using a decaline solution.

(v) DCL: Determined in decaline at 135° C.

(vi) DCA: Determined in dioctyladipate at 145° C.

(vii) Expansion factor: A ratio of $[\eta]$ DCL to $[\eta]$ DCA (i.e. $[\eta]$DCL/$[\eta]$DCA)

(viii) Melt tension: A tension of a strand extruded from a flow tester at a temperature of 190° C. and at a plunger speed of 2.0 cm/min was determined at 10 m/min.

(ix) E.S.C.R. (environmental stress cracking resistance): Time at which 50% of test bottles was broken in the following test. 500 cc bottles having a weight of 42 g and a section thickness of 0.8 mm were blow molded at a cylinder temperature of 160° C. and a die temperature of 40° C. by using a blow molding machine provided with a 50 mmφ extruder. 50 cc of a nonionic surface active agent was added to these bottles and a constant inner pressure (i.e. 0.8 kg/cm² G) was applied to the bottles in an oven at a temperature of 60° C.

(x) Izod impact strength: Determined according to an ASTM D-256 method.

(xi) Die swell: Weight of parison having a length of 20 cm extruded at a temperature of 170° C. by using a blow molding die having an outer diameter of 16 mm and an inner diameter of 10 mm.

EXAMPLE 1

(1) Synthesis of Catalyst

Two liters of a 1 mol/liter trichlorosilane (HSiCl₃) solution in hexane was charged to a 8 autoclave and kept at a temperature of 50° C. Two liters of a 1 mol/l liter organoaluminum-magnesium complex solution in hexane was dropwise added to the autoclave for 2 hours and, then, the mixture was reacted at the same temperature for 2 hours. The composition of the complex was AlMg$_{6.0}$(C$_2$H$_5$)$_{2.0}$(n-C$_4$H$_9$)$_{9.5}$(OC$_4$H$_9$)$_{3.5}$. The resultant solid component was washed with hexane twice by a decantation method. Two liters of titanium tetrachloride was charged to the slurry containing the solid component and reacted with each other at a temperature of 130° C. for 2 hours. The resultant solid catalyst was isolated and washed with hexane until no free halogen was detected. The resultant solid catalyst contained 2.1% by weight of titanium.

(2) Production of High- and Medium-Density Polyethylene

Polyethylene was produced by continuous polymerization in a 200 liter stainless steel reactor. The polymerization was carried out at a polymerization temperature of 86° C. and under a polymerization pressure of 12 kg/cm²G and was controlled so as to produce 8 kg/hr of the desired polymer. 0.5 mmol/l of triethylaluminum catalyst was used and the solid catalyst was charged, together with 30 l/hr of hexane, so as to form 8 kg/hr of the polymerization product. Hydrogen was used as a molecular weight modifier.

The high molecular weight polyethylene component (A) was prepared by copolymerizing ethylene and butene-1 so as to form the polymer having a density of 0.946 g/cm³ and a molecular weight of 380000 by adjusting a vapor phase composition. The hydrogen concentration was about 15 mol% and the butene-1 concentration was about 2.5 mol%. The catalyst efficiency (i.e., amount of polymer produced in one hour based on 1 g of titanium contained in the catalyst) was 730000 g-polymer/g-Ti.

The low molecular weight polyethylene component (B) was prepared by polymerizing ethylene so as to form the polymer having a molecular weight of 21000 and a density of 0.976 g/cm³. The hydrogen content was about 15 mol% and the catalyst efficiency was 100000 g-polymer/g-Ti.

(3) Production of Crosslinked Polyethylene Composition

The polyethylene components (A) and (B) in the form of powder obtained in the above step (2) were mixed together at a weight ratio of 50:50. To the resultant mixture, 50 ppm of a crosslinking agent, 2,5-dimethyl-2,5-di(t-butylperoxy)hexane was added and the mixture was thoroughly agitated and blended in a Henschel mixer. Thus, a uniform mixture of the polyethylene components (A) and (B) and 2,5-dimethyl-2,5-di(t-butylperoxy)hexane was obtained.

The mixture obtained above was extruded from a single-screw type extruder provided with a 60 mmφ screw at a temperature of 230° C. and an extrusion rate of about 35 kg/hr under nitrogen gas seal. Thus, crosslinked polyethylene pellets were obtained. The average retention time of the resin in the extruder was 2 min. 40 sec. To the pellets of the crosslinked polyethylene composition, 500 ppm of BHT and 500 ppm of calcium stearate were added and the mixture was reextruded in the same conditions as used above. Thus, the crosslinked polyethylene composition containing the stabilizers was obtained in the form of pellets.

COMPARATIVE EXAMPLE 1

To a mixture of the polyethylene powder components (A) and (B), obtained in Example 1, at a mixing ratio of 50:50, 500 ppm of BHT and 500 ppm of calcium stearate were added. The resultant mixture was extruded from the extruder used in Example 1 under the same conditions as used in Example 1.

Thus, non-crosslinked polyethylene composition in the form of pellets was obtained.

COMPARATIVE EXAMPLE 2

Polyethylene components (A) and (B) were polymerized by using the same catalyst, the same reactor and the same polymerization conditions as described in Example 1, except that the molecular weights of the polyethylene components (A) and (B) were adjusted to 450000 and 25000, respectively. The hydrogen concentrations in the polymerization of (A) and (B) were about 12 mol % and about 72 mol %, respectively. The catalyst efficiencies of (A) and (B) were 770000 g-polymer/g-Ti and 110000 g-polymer/g-Ti, respectively. The polyethylene component (A) was a copolymer of ethylene and butene-1 having a density of 0.947 g/cm$^3$ and a butene-1 content of 2.2 mol %.

The polyethylene components (A) and (B) were uniformly mixed together at a weight ratio of 50:50. The mixture thus obtained was extruded, after adding BHT and calcium stearate, in the same manner as in Comparative Example 1.

Thus, non-crosslinked polyethylene composition in the form of pellets was obtained.

COMPARATIVE EXAMPLE 3

Medium-molecular weight polyethylene having a molecular weight of about 150000 and a density of 0.961 g/cm$^3$ was prepared by using the same catalyst and the same reactor as in Example 1. The hydrogen concentration was about 32 mol %, the butene-1 concentration 0.7 mol % and the catalyst efficiency about 530000 g-polymer/g-Ti.

The medium-molecular weight polyethylene obtained above was extruded, after adding BHT and calcium stearate thereto, in the same manner as in Comparative Example 1.

COMPARATIVE EXAMPLE 4

A crosslinked polyethylene composition was prepared from the medium-molecular weight polyethylene obtained in Comparative Example 3 by using the crosslinking agent of Example 1 in the same manner as described in Example 1, except that the concentration of the crosslinking agent was changed to 44 ppm so as to obtain the same MI as in Example 1.

The physical properties of the polyethylene compositions obtained in Example 1 and Comparative Examples 1, 2, 3 and 4 are shown in Table 1 below.

As is clear from Table 1, the crosslinked polyethylene composition of Example 1 according to the present invention had an excellent ESCR and Izod impact strength, and a high melt tension and die swell. Taking into account the fact that the characteristics of polyethylene are varied depending upon MI, MIR, and other similar properties, the advantageous features of the present invention are further clarified as compared with Example 1 and Comparative Examples 1 and 2 having the same MI. That is, the polyethylene composition of Comparative Example 1 had a low impact strength as well as a low melt tension and die swell, as compared with that of Example 1. It is generally recognized in the art that the impact strength of polyethylene decreases with the increase in MIR. However, the crosslinked polyethylene composition of Example 1 had a high impact strength as compared with the polyethylene of Comparative Example 2, although MIR of Example 1 was higher than that of Comparative Example 2. Furthermore, the polyethylene composition of Comparative Example 4 had a remarkably low ESCR as well as a low melt tension and die swell.

As stated above, the polyethylene composition of Example 1 was prepared by crosslinking the polyethylene composition of Comparative Example 1 and the polyethylene composition of Comparative Example 4 was prepared by crosslinking the polyethylene composition of Comparative Example 3. However, there were the differences in change ratios of MIR, melt tension, die swell, impact strength and expansion factor between the crosslinked product of the polyethylene composition containing components (A) and (B) and the crosslinked product of the ordinary polyethylene composition, even when the change ratio of MI was the same. This is summarized in Table 2 below.

As is clear from Table 2, the increase rates in the melt tension, impact strength, die swell, ESCR and expansion factor of the crosslinked polyethylene composition containing the polyethylene components (A) and (B) are higher than those of the crosslinked product of the ordinary polyethylene.

TABLE 1

| | | MI (g/10 min) | MIR | Density (g/cm$^3$) | Melt tension (g) | ESCR (hrs) | Izod impact strength (kg-cm/cm) | Die swell (g) | [η] DCL (dl/g) | Expansion factor (α) |
|---|---|---|---|---|---|---|---|---|---|---|
| Example 1 | Crosslinking | 0.21 | 130 | 0.961 | 8.5 | 32 | 21.2 | 38.0 | 1.71 | 4.3 |
| Comparative Example 1 | Non-crosslinking | 0.37 | 81 | 0.962 | 6.3 | 31 | 11.4 | 35.8 | 1.51 | 1.9 |
| Comparative Example 2 | Non-crosslinking | 0.20 | 90 | 0.962 | 7.4 | 37 | 13.5 | 35.2 | 1.79 | 1.9 |
| Comparative Example 3 | Non-crosslinking | 0.38 | 47 | 0.961 | 6.9 | 2.1 | 20.6 | 36.0 | 1.48 | 2.1 |
| Comparative Example 4 | Crosslinking | 0.22 | 72 | 0.961 | 8.2 | 1.5 | 25.2 | 37.1 | 1.50 | 2.5 |

TABLE 2

| | MI change ratio* $(MI)_2/(MI)_1$ | Melt tension change ratio* | ESCR change ratio* | Izod impact strength change ratio* | Die swell change ratio* | Expansion factor change ratio* $(a_2/a_1)$ | MIR change ratio* | | Remarks |
|---|---|---|---|---|---|---|---|---|---|
| Crosslinking of composition containing (A) and (B) | 0.57 | 1.35 | 1.03 | 1.86 | 1.06 | 2.26 | 1.60 | Comparative Example 1 | (Noncrosslinked) |
| | | | | | | | | Example 1 | (Crosslinked) |
| Crosslinking of ordinary polyethylene | 0.58 | 1.19 | 0.71 | 1.22 | 1.03 | 1.19 | 1.53 | Comparative Example 3 | (Noncrosslinked) |
| | | | | | | | | Comparative Example 4 | (Crosslinked) |
| Crosslinking of composition containing (A) and (B) | 0.30 | 1.91 | 1.20 | 1.75 | 1.08 | 1.75 | 1.81 | Comparative Example 5 | (Noncrosslinked) |
| | | | | | | | | Example 2 | (Crosslinked) |
| Crosslinking of ordinary polyethylene | 0.33 | 1.65 | 1.09 | 1.41 | 1.03 | 1.23 | 1.72 | Comparative Example 7 | (Noncrosslinked) |
| | | | | | | | | Comparative Example 8 | (Crosslinked) |
| Crosslinking of composition containing (A) and (B) | 0.18 | 2.41 | 1.80 | 2.04 | 1.10 | 3.82 | 3.00 | Comparative Example 9 | (Noncrosslinked) |
| | | | | | | | | Example 3 | (Crosslinked) |
| Crosslinking of composition containing (A) and (B) | 0.06 | 4.31 | 3.20 | 5.27 | 1.04 | 8.52 | 4.14 | Comparative Example 9 | (Noncrosslinked) |
| | | | | | | | | Example 4 | (Crosslinked) |
| Crosslinking of composition containing (A) and (B) | 0.008 | — | — | >5.4 | 0.92 | — | 5.85 | Comparative Example 9 | (Noncrosslinked) |
| | | | | | | | | Comparative Example 10 | (Crosslinked) |
| Crosslinking of composition containing (A) and (B) | 0.6 | 1.38 | 1.20 | 1.20 | 1.04 | 1.53 | 1.26 | Comparative Example 9 | (Noncrosslinked) |
| | | | | | | | | Example 5 | (Crosslinked) |

*Change ratio = $\frac{\text{Physical value after crosslinking}}{\text{Physical value before crosslinking}}$

EXAMPLE 2

(1) Synthesis of Catalyst

One hundred and thirty eight grams of di-n-butylmagnesium and 19 g of triethylaluminum were charged, together with 2 liters of n-heptane, to a 4 liter vessel provided with an agitator. The mixture was allowed to react at a temperature of 80° C. for 2 hours. Thus, an organoaluminum-magnesium complex having a composition of $AlMg_6(C_2H_5)_3(n-C_4H_9)_{12}$ was synthesized. 800 ml of this complex solution in n-heptane containing 400 mmol (54 g) of the complex and 800 ml of a titanium tetrachloride solution in n-heptane containing 400 mmol of titanium tetrachloride were allowed to react at a temperature of −20° C. for 4 hours with stirring, after the water and oxygen were replaced with a dry nitrogen gas. The formed solid insoluble in a hydrocarbon was isolated and, then, washed with n-heptane to obtain 106 g of a solid catalyst.

(2) Production of High- and Medium-Density Polyethylene

Polymerization was carried out by using the reactor of Example 1 at the same temperature and pressure as in Example 1. The triethylaluminum catalyst was used in a concentration of 0.5 mmol/l and the solid catalyst was charged, together with 30 l/hr of hexane, to form the desired polymer at a production rate of 8 kg/hr. Hydrogen was used as a molecular weight modifier. Butene-1 was used as a comonomer.

The high molecular weight polyethylene component (A) was prepared by copolymerizing ethylene and butene-1 so as to form the polymer having a density of 0.945 g/cm$^3$ and a molecular weight of 170000 by adjusting a vapor phase composition. The hydrogen concentration was about 30 mol % and the butene-1 concentration was about 3.3 mol %. The catalyst efficiency was 390000 g-polymer/g-Ti.

The low molecular weight polyethylene component (B) was prepared by polymerizing ethylene and butene-1 so as to form the polymer having a molecular weight of 43000 and a density of 0.950 g/cm$^3$. The hydrogen content was about 55 mol %, the butene-1 content was 4.5 mol % and the catalyst efficiency was 180000 g-polymer/g-Ti.

(3) Production of Crosslinked Polyethylene Composition

The polyethylene components (A) and (B) prepared in the above step (2) were mixed together at a weight ratio of 60:40 and 120 ppm of a crosslinking agent, di-t-butylperoxide was added thereto.

The mixture thus obtained was kneaded and extruded under the same conditions as used in Example 1. Thus, a crosslinked polyethylene composition was obtained.

COMPARATIVE EXAMPLE 5

To a mixture of the polyethylene powder components (A) and (B), obtained in Example 2, at a mixing ratio of 60:40, 500 ppm of BHT and 500 ppm of calcium stearate were added. The resultant mixture was extruded from the extruder used in Example 1 under the same conditions as used in Example 1. Thus, non-crosslinked polyethylene composition was obtained.

COMPARATIVE EXAMPLE 6

Polyethylene components (A) and (B) were polymerized by using the same catalyst, the same reactor and the same polymerization conditions as described in Example 2.

The high molecular weight polyethylene component (A) was obtained by adjusting the vapor phase composition so as to form polyethylene having a molecular weight of 240000 and a density of 0.945 g/cm². The hydrogen concentration was about 23 mol %, the butene-1 concentration 3.4 mol % and the catalyst efficiency 520000 g-polymer/g-Ti.

The low molecular weight polyethylene component (B) was obtained by adjusting the vapor phase composition so as to form polyethylene having a molecular weight of 60000 and a density of 0.950 g/cm³. The hydrogen concentration was about 48 mol %, the butene-1 concentration 4.5 mol % and the catalyst efficiency 250000 g-polymer/g-Ti.

The polyethylene components (A) and (B) were uniformly mixed together at a weight ratio of 60:40. The mixture thus obtained was extruded, after adding BHT and calcium stearate, in the same manner as in Comparative Example 5.

Thus, the non-crosslinked polyethylene composition was obtained.

COMPARATIVE EXAMPLE 7

Medium-molecular weight polyethylene having a molecular weight of about 110000 and a density of 0.949 g/cm³ was prepared by using the same catalyst and the same reactor as in Example 2. The hydrogen concentration was about 38 mol % the butene-1 concentration 3.6 mol % and the catalyst efficiency about 410000 g-polymer/g-Ti.

The medium-molecular weight polyethylene obtained above was extruded, after adding BHT and calcium stearate thereto, in the same manner as in Comparative Example 6. Thus, the non-crosslinked polyethylene composition was obtained.

COMPARATIVE EXAMPLE 8

A crosslinked polyethylene composition was prepared from the polyethylene obtained in Comparative Example 7 by using 105 ppm of the crosslinking agent of Examples 1 and 2 in the same manner as described in Example 1.

The physical properties of the polyethylene compositions obtained in Example 2 and Comparative Examples 5, 6, 7 and 8 are shown in Table 3 below. Furthermore, the differences in the technical effects between the crosslinked product of the polyethylene composition containing the components (A) and (B) and the crosslinked product of the ordinary polyethylene composition are shown in Table 2 above.

EXAMPLE 3

High molecular weight polyethylene (A) and low molecular weight polyethylene (B) were prepared by using the catalyst of Example 2 in the same manner as in Example 2. The vapor compositions were adjusted so as to obtain the polymer having a molecular weight of 250000 and a density of 0.955 g/cm³ in (A) and the polymer having a molecular weight of 25000 and a density of 0.974 g/cm³. The hydrogen concentrations in (A) and (B) were about 25 mol % and about 70 mol %, respectively and the catalyst efficiencies in (A) and (B) were about 450000 g-polymer/g-Ti and about 60000 g-polymer/g-Ti, respectively.

The polyethylene components (A) and (B) thus obtained were mixed together at a weight ratio of 35:65.

To the resultant mixture, 0.04% by weight of a crosslinking agent, 2,5-dimethyl-2,5-di(t-butylperoxy)hexane was added and the mixture was kneaded and extruded under the same conditions as used in Examples 1 and 2. Thus, a crosslinked polyethylene composition was prepared. Thereafter, 500 ppm of BHT, 300 ppm of Irganox 1010 and 500 ppm of calcium stearate were added to the extruded crosslinked composition and the mixture was reextruded in the same conditions as used above. Thus, the crosslinked polyethylene composition containing the stabilizers was obtained in the form of pellets.

COMPARATIVE EXAMPLE 9

A noncrosslinked polyethylene composition was prepared by mixing the polyethylene components (A) and (B) prepared in Example 3 at a weight ratio of 35:65 and, then, extruded in the same manner as in Example 3 after adding 500 ppm of BHT, 300 ppm of Irganox 1010 and 500 ppm of calcium stearate to the mixture.

The physical properties of the compositions of Example 3 and Comparative Example 9 are shown in Table 4 below and the change rates of the physical properties due to the crosslinking are shown in Table 2 above.

EXAMPLE 4

Example 3 was repeated except that the concentration of the crosslinking agent was changed to 0.06% by weight.

The physical properties of the crosslinked polyethylene composition thus obtained are shown in Table 4 below and the change rates of the physical properties due to the crosslinking are shown in Table 2 above.

COMPARATIVE EXAMPLE 10

Example 3 was repeated except that the concentration of the crosslinking agent was changed to 0.15% by weight.

TABLE 3

| | | MI (g/10 min) | MIR | Density (g/cm³) | Melt tension (g) | ESCR (hrs) | Izod impact strength (kg-cm/cm) | Die swell (g) | [η] DCL (dl/g) | Expansion factor (α) |
|---|---|---|---|---|---|---|---|---|---|---|
| Example 2 | Crosslinking | 0.33 | 105 | 0.948 | 8.2 | 18 | 18.9 | 40.9 | 1.41 | 3.5 |
| Comparative Example 5 | Non-Crosslinking | 1.1 | 58 | 0.949 | 4.3 | 15 | 10.8 | 37.9 | 1.18 | 2.0 |
| Comparative Example 6 | Non-crosslinking | 0.34 | 74 | 0.949 | 7.0 | 19 | 12.3 | 36.5 | 1.50 | 1.9 |
| Comparative Example 7 | Non-crosslinking | 1.0 | 43 | 0.949 | 4.8 | 4.5 | 13.5 | 37.4 | 1.28 | 2.2 |
| Comparative Example 8 | Crosslinking | 0.33 | 74 | 0.948 | 7.9 | 4.9 | 19.0 | 38.5 | 1.29 | 2.6 |

The physical properties of the crosslinked polyethylene composition thus obtained are shown in Table 4 below.

As is shown in Table 4 below, the melt tension, ESCR, [η]DCL and the expansion factor could not be determined. This is because gel was formed by the excessive crosslinking so that the melt tension property became worse and also because a bottle could not be mold due to the fact that the pinch-off portions were not melt bonded together during the bottle molding process.

EXAMPLE 5

Example 3 was repeated except that the concentration of the crosslinking agent was changed to 0.003% by weight.

The physical properties of the crosslinked polyethylene composition thus obtained are shown in Table 4 below and the change rates of the physical properties due to the crosslinking are shown in Table 2 above.

10, and the ratio of the melt index $(MI)_2$ to $(MI)_1$ $[(MI)_2/(MI)_1]$ is 0.03 through 0.9, wherein:

$(MI)_1$ and $(MI)_2$ are melt indexes of the polyethylene compositions before and after crosslinking, respectively; and $\alpha_1$ and $\alpha_2$ are expansion factors of the polyethylene compositions before and after crosslinking, respectively.

2. A composition as claimed in claim 1, wherein the viscosity-average molecular weights of polyethylenes (A) and (B) are 120,000 through 800,000 and 5,000 through 80,000, respectively, and the ratio of the molecular weights of polyethylene (A) to (B) is 3 through 50.

3. A composition as claimed in claim 1 or 2, wherein the blending ratio of polyethylene (A) to polyethylene (B) is 20:80 through 70:30.

4. A composition as claimed in claims 1 or 2, wherein $\alpha_2/\alpha_1$ is 1.5 through 5.0 and $(MI)_2/(MI)_1$ is 0.05 through 0.7.

5. A composition as claimed in claim 1 or 2, crosslink-

TABLE 4

| | | MI (g/10 min) | MIR | Density (g/cm³) | Melt tension (g) | ESCR (hrs) | Izod impact strength (kg-cm/cm) | Die swell (g) | [η] DCL (dl/g) | Expansion factor (α) |
|---|---|---|---|---|---|---|---|---|---|---|
| Example 3 | Crosslinking | 0.45 | 195 | 0.963 | 7.0 | 4.5 | 15.1 | 43.5 | 1.31 | 6.5 |
| Comparative Example 9 | Non-crosslinking | 2.5 | 65 | 0.965 | 2.9 | 2.5 | 7.4 | 39.4 | 0.98 | 1.7 |
| Example 4 | Crosslinking | 0.18 | 269 | 0.961 | 12.5 | 8.0 | 39.0 | 40.8 | 1.59 | 14.5 |
| Comparative Example 10 | Crosslinking | 0.02 | 380 | 0.958 | Determination impossible | Determination impossible | >40 | 36.3 | Determination impossible | Determination impossible |
| Example 5 | Crosslinking | 1.5 | 82 | 0.965 | 4.0 | 3.0 | 8.9 | 40.8 | 1.08 | 2.6 |

We claim:

1. A crosslinked polyethylene composition obtained by lightly crosslinking and intimately melt blending a composition comprising high- and medium-density polyethylene (A) having a high molecular weight and a high- and medium-density polyethylene (B) having a low molecular weight, wherein
   (i) the viscosity-average molecular weight of polyethylene (A) is 100,000 through 1,000,000, the viscosity-average molecular weight of polyethylene (B) is 1,000 through 100,000, and the ratio of the molecular weight of polyethylene (A) to that of polyethylene (B) is 2 through 100,
   (ii) the blending ratio of polyethylene (A) to polyethylene (B) is 5:95 through 80:20, and
   (iii) melt index $(MI)_1$ is 0.01 through 3.5, the ratio of the expansion factor $\alpha_2$ to $\alpha_1$ $(\alpha_2/\alpha_1)$ is 1.1 through ing being carried out at a temperature of 150° C. through 290° C. in the pressure of not less than 0.001% but less than 0.1% by weight, based on the total weight of polyethylenes (A) and (B), of a crosslinking agent, the crosslinking agent being at least one compound selected from the group consisting of di-t-butylperoxide, di-cumylperoxide, 2,5-dimethyl-2,5-di(t-butylperoxy)hexyne, 2,5-dimethyl-2,5(t-butylperoxy)hexane, and 1,3-bis(t-butylperoxyisopropyl)benzene.

6. A composition as claimed in claim 1 or 2, wherein the number of double bonds contained in polyethylene (A) and polyethylene (B) is not more than 0.15 per 1,000 carbon atoms.

7. A molded article obtained from the composition of claim 1 by means of blow molding, extrusion molding, or film molding.

* * * * *